United States Patent
Lambertus et al.

(10) Patent No.: US 10,107,986 B2
(45) Date of Patent: Oct. 23, 2018

(54) MOCKUP, MOCKUP SYSTEM, UNDERWATER VESSEL OR SINKER, TOGETHER WITH A TRANSFER MECHANISM, VESSEL AND TRAINING METHOD

(71) Applicant: ATLAS ELEKTRONIK GMBH, Bremen (DE)

(72) Inventors: Detlef Lambertus, Osterholz-Scharmbeck (DE); Dennis Meyer, Ganderkesse (DE)

(73) Assignee: ATLAS ELEKTRONIK GMBH, Bremen (DE)

( * ) Notice: Subject to any disclaimer, the term of this patent is extended or adjusted under 35 U.S.C. 154(b) by 0 days.

(21) Appl. No.: 15/323,326

(22) PCT Filed: Jun. 26, 2015

(86) PCT No.: PCT/DE2015/100261
§ 371 (c)(1),
(2) Date: Dec. 30, 2016

(87) PCT Pub. No.: WO2016/015710
PCT Pub. Date: Feb. 4, 2016

(65) Prior Publication Data
US 2017/0146765 A1    May 25, 2017

(30) Foreign Application Priority Data

Jul. 28, 2014    (DE) .................. 10 2014 110 604

(51) Int. Cl.
*H04B 17/00*    (2015.01)
*G02B 6/50*    (2006.01)
(Continued)

(52) U.S. Cl.
CPC .............. *G02B 6/506* (2013.01); *B63G 8/001* (2013.01); *G02B 6/266* (2013.01); *G02B 6/4457* (2013.01);
(Continued)

(58) Field of Classification Search
CPC ...... G02B 6/506; G02B 6/266; G02B 6/4457; G02B 6/4471; B63G 8/001; B63G 8/0001;
(Continued)

(56) References Cited

U.S. PATENT DOCUMENTS 4,707,666 A    11/1987    Falkenstein et al.
5,793,917 A *    8/1998    Yoshimura ......... H04B 10/2525
359/333
(Continued)

FOREIGN PATENT DOCUMENTS

DE           3337131 A1    4/1985
DE    10 2011 107824 A1    1/2013
(Continued)

OTHER PUBLICATIONS

International Search Report for PCT/DE2015/100261 dated Nov. 10, 2015; English translation submitted herewith (6 pages).
(Continued)

*Primary Examiner* — Tesfaldet Bocure
(74) *Attorney, Agent, or Firm* — Fitch, Even, Tabin & Flannery, LLP

(57) ABSTRACT

The invention relates to a mockup with an optical transmission path, which optically connects the optical entrance to the optical exit, wherein an optical attenuator is arranged in the optical transmission path, wherein an optical condition of the transmission path is adjusted by means of the optical attenuator so that an optical transmission behavior of a wound optical fiber is simulated. The invention also relates
(Continued)

Figure 1:
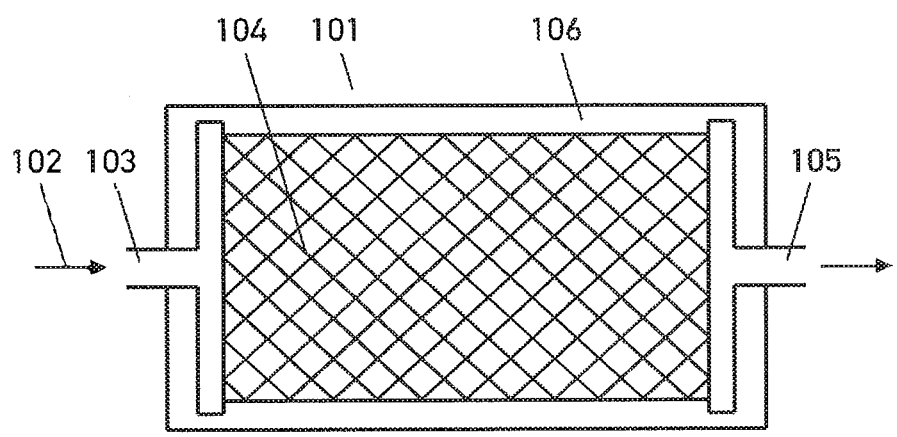

to a mockup system, underwater vessel and/or sinker, a transfer mechanism, and a vessel, together with a training method with a mockup, which is deployed in an underwater vessel and/or in a sinker.

16 Claims, 4 Drawing Sheets

(51) Int. Cl.
  *G02B 6/26* (2006.01)
  *B63G 8/00* (2006.01)
  *G02B 6/44* (2006.01)
  *H04B 10/077* (2013.01)
  *H04B 10/80* (2013.01)
  *B63B 27/16* (2006.01)
(52) U.S. Cl.
  CPC ....... *G02B 6/4471* (2013.01); *H04B 10/0775* (2013.01); *H04B 10/80* (2013.01); *B63B 2027/165* (2013.01); *B63G 2008/007* (2013.01)
(58) Field of Classification Search
  CPC ... H04B 10/0775; H04B 10/80; H04B 10/775
  See application file for complete search history.

(56) References Cited

U.S. PATENT DOCUMENTS

| | | |
|---|---|---|
| 6,374,014 B1 | 4/2002 | Jablonski |
| 2003/0091320 A1 | 5/2003 | Wu et al. |
| 2008/0199139 A1 | 8/2008 | Henderson |
| 2010/0313659 A1* | 12/2010 | Berg ................... G01P 15/093 73/514.26 |
| 2011/0114006 A1 | 5/2011 | Jung |
| 2011/0188812 A1* | 8/2011 | Han ........................ G02B 6/36 385/77 |
| 2012/0328372 A1 | 12/2012 | Hawkes et al. |
| 2014/0107862 A1 | 4/2014 | Jung |

FOREIGN PATENT DOCUMENTS

| | | |
|---|---|---|
| EP | 2 327 622 A1 | 6/2011 |
| JP | 2009-103513 A | 5/2009 |

OTHER PUBLICATIONS

German Patent Office, Search Report, dated Apr. 15, 2015, issued in DE 10 2014 110 604.0.

* cited by examiner

Prior Art

MOCKUP, MOCKUP SYSTEM, UNDERWATER VESSEL OR SINKER, TOGETHER WITH A TRANSFER MECHANISM, VESSEL AND TRAINING METHOD

CROSS-REFERENCE TO RELATED APPLICATIONS

This application is a U.S. national phase application filed under 35 U.S.C. § 371 of International Application No. PCT/DE2015/100261, filed Jun. 26, 2015, designating the United States, and claims priority from German Patent Application No. 10 2014 110 604.0, filed Jul. 28, 2014, and the complete disclosures of which applications are hereby incorporated herein by reference in their entirety for all purposes.

FIELD

The invention relates to a mockup with an optical entrance, an optical exit and an optical transmission path, which optically links the optical entrance to the optical exit, together with a mockup system, an underwater vessel and/or sinker, transfer mechanism, a vessel and a training method.

BACKGROUND

On transferring an underwater vessel into a body of water, the exchange of information takes place between the starting device and the underwater vessel via fiber-optic cables. Glass fiber cables, which are cross-wound in glass fiber reels to ensure reliable unwinding, are generally used for this purpose.

Glass fiber reels are used in the underwater vessel and in sinkers or, where necessary, on launching ramps. After an underwater vessel has been transferred, the glass fiber reels unroll due to the forces of inertia or the forces occurring due to launching speed. After unwinding, a glass fiber reel cannot be reused since an adhesive medium is generally used to bind the glass fiber cables onto the spool. Furthermore, it is difficult to recover the unwound glass fiber cable from the water again.

The use of optical fiber reels involves a high degree of material consumption and high costs. This is undesirable, particularly in the training process, since here the operating personnel are only training in transferring the underwater vessel into the water and, where required, are supposed to perform a functional check of the transfer of information between the launching mechanism and the underwater vessel.

Optical fiber reels, however, must also be used in training since the optical fiber reels must be tested in order to guarantee the thorough operational readiness of an underwater vessel. In practice, this means that completely intact glass fiber reels are deployed for training purposes, which subsequently, due to partial unwinding or destruction, may no longer be used for an actual operation.

SUMMARY

The object of the invention is to improve the prior art.

The object is achieved by a mockup with an optical entrance, an optical exit and an optical transmission path, which optically links the optical entrance to the optical exit, wherein an optical attenuator is arranged in the optical transmission path, wherein an optical condition of the transmission path is adjusted by means of the optical attenuator so that an optical transmission behavior of a wound optical fiber is simulated.

An essential concept of the invention is based on the use of a mockup in place of a wound optical fiber. Both in its manufacture and in its use, the mockup can save considerably more material and can be more economical.

The mockup simulates, in particular, the optical transmission characteristics of the wound fiber-optic cable. A functional check of the transfer of information is performed by means of the mockup, without a wound fiber-optic cable having to be unwound.

It is particularly advantageous that the mockup is directly deployed in place of a wound optical fiber in an underwater vessel and/or a sinker, so that the wound optical fiber is not unwound.

In addition, the mockup can be designed to be shorter in length than the wound optical fiber on the reel since the minimum length of the optical transmission path of the mockup must only connect the optical entrance to the optical exit. Hence, in comparison with the prior art, the manufacture of the mockup with the same optical functionality can already be realized using less material.

It is advantageous that the optical transmission behavior is specifically adjusted in the mockup by the optical attenuator and a wound fiber-optic cable is simulated thereby.

The terms are outlined in the following:

A "mockup" is a device, which emulates, in particular, the characteristics of a wound optical fiber in a cartridge, wherein the cartridge, as a rule, consists of the spool in the actual operation case and is inserted, for example, into the stern of an underwater vessel or must be inserted here. The mockup simulates, in particular, the external component properties of the cartridge and the internal characteristics of a (cross-)wound optical fiber, in particular, the functionality.

In each case, the mockup simulates an optical transmission behavior of a wound optical fiber.

A "fiber-optic cable" is a cable consisting of one or more optical fibers or a cable for the transmission of light. Here, in particular, the light is conducted in fibers (core) made from glass, quartz glass or plastic. This light-conducting core, via which, in particular, communication signals or light signals can be transferred, is surrounded by a jacket with a low refractive index, for example, and protective layers made from plastic. A synonymous term for fiber-optic cable is glass fiber cable, wherein, strictly speaking, the core or the optical fibers of the glass fiber cable must not necessarily be composed of a "glass".

A "wound fiber-optic cable" means, in particular, a reel of cross-wound optical fiber. For example, a few meters up to several kilometers of optical fiber are wound onto a reel, in particular, a length of between 10 m and 10 km of optical fiber. Here, conventional lengths for use are between 2000 m and 3500 m. in order to guarantee reliable unwinding, the wound fiber-optic cable is usually treated with a low-adhesive material, which prevents shifting of the wound coils.

"Simulates" means, in particular, the emulation of the optical transmission behavior of a wound optical fiber by a mockup. For example, the mockup emulates the optical transmission behavior of a wound optical fiber so that the same optical condition is present at the optical exit of the mockup as at the optical exit of the wound optical fiber.

An "optical condition" is a characteristic of the light, such as the intensity, wavelength and/or frequency, which is adjusted by the optical attenuator in the optical transmission path so that this is present at the optical exit.

The "optical entrance" is the entrance of the light into the mockup. The optical entrance can be designed as a connector, for example. Alternately, the optical entrance can be a tube, through which the light entering is freely conducted.

The "optical exit" is the exit of the light from the mockup. The optical exit can be designed as a connector, for example. Alternately, the optical exit can be a tube, through which the light exiting is freely conducted.

It is particularly advantageous if the optical entrance and the optical exit are realized so that these are identical in form to the optical entrance and the optical exit of the wound optical fiber. Consequently, the wound fiber-optic cable can be directly replaced by the mockup. The mockup can also be directly connected to existing incoming and outgoing optical fiber cables after the wound optical fiber has been removed.

The optical entrance and the optical exit can be integrated into connectors, so that a direct connection can be created with a mating connector of a cable outside of the mockup.

The "optical transmission path" is the transmission path of the information between the optical entrance and the optical exit.

Light can be optically transmitted via the optical transmission path.

Light properties can also be transmitted electronically via the optical transmission path, in particular, if the light properties are initially converted into an electronic signal.

The optical transmission path in the mockup can be shorter than that of the wound optical fiber since the transmission path of the mockup must only cover the minimal route from the optical entrance to the optical exit.

For example, the optical transmission path of the mockup is 50 cm and thus corresponds directly with the external length of an optical fiber reel between the optical entrance and the optical exit, while the transmission path of the wound optical fiber, for example, is 3,000 m.

An "optical attenuator" is arranged in the optical transmission path and attenuates the incoming light in a specific manner. The optical attenuator adjusts the optical conditions of the transmission path so that an optical transmission behavior of a wound optical fiber is simulated.

The optical attenuator dampens characteristic light properties and/or modifies these, whereby the optical conditions of the transmission path are adjusted. For example, the attenuator adjusts the intensity of the light, the wavelength, the frequency, the light absorption and/or the light diffusion.

The optical attenuator can fill the optical transmission path completely or partially.

In one embodiment, the optical transmission path consists partially or completely of a fiber-optic cable.

Thus, the fiber-optic cable can be led directly between the optical entrance and the optical exit over the shortest route. As well, this fiber-optic cable does not have to be additionally coated with adhesive media.

Advantageously, the fiber-optic cable is provided with plug-in connectors. The plug-in connectors are mounted at the optical entrance and/or optical exit or in each section of the optical fiber. Thus, the fiber-optic cable in the mockup can be directly connected to ready-made connectors on the fiber-optic cable outside of the mockup, which lead to the launching mechanism and/or the sinker and/or the underwater vessel.

In a further embodiment, the mockup has strain relief elements for the fiber-optic cable, whereby, in particular, the fiber-optic cable is designed so as to be strain-free.

Thus, due to the high tensile design, jerky movements on transferring the sinker and/or the underwater vessel do not result in the fiber-optic cable being pulled out of the connection in the mockup and consequently losing its functionality.

As well, the fiber-optic cable within the mockup has the required tensile strength for the sinker and/or the underwater vessel to be reeled in via an external optical fiber cable.

"Strain relief elements" relieve the ends of the optical fiber when tensile forces occur. For this purpose, a strain relief element is incorporated into at least one end of the optical fiber cable.

Advantageously, at least two strain relief elements are arranged so that the optical fiber ends in the area between the strain relief elements can be connected together, creating a strain-relieved plug-in connection.

In a further embodiment, the mockup has an active and/or passive attenuator.

A "passive attenuator" is inserted into the optical transmission path and, due to its material characteristics, in particular, passively adjusts an optical condition of the transmission path.

A passive attenuator has the advantage that this already changes the optical transmission behavior by simply being inserted into the transmission path. An optical filter, for example, is a passive attenuator.

With an "active attenuator", the characteristics of the light such as the light intensity and/or the light wavelength are specifically adjusted by the active attenuator in the transmission path.

For example, the light intensity of the light entering is measured at the entrance and a reference value corresponding with the value at the optical exit of the wound optical fiber is then determined electronically. This adjusted reference value is then emitted at the exit, in particular, by means of an optical transmitter (e.g. LED, light emitting diode).

One particular advantage of the active attenuator is that the properties of the transmitted light can be adjusted very specifically and the adjustments can be changed or modulated more easily. As well, training exercises using incorrectly adjusted values can take place so that similar faults can also be simulated.

Consequently, the optical transmission behavior of wound optical fibers of different lengths and hence of different attenuations can also be simulated more easily with an active attenuator, without having to replace the attenuator. Accordingly, various wound fiber-optic cables can be simulated with the same mockup, without having to replace these.

Thanks to the active adjustability, different light properties can be varied simultaneously or in succession by means of the active attenuator for testing purposes.

For example, the light intensity can be attenuated initially and only a certain light wavelength can then be transmitted. In this way, different functional tests and other series of information transmission tests can be carried out.

In a further embodiment, the optical conditions are adjusted using the passive attenuator by changing a refractive index and/or a light absorption and/or a light diffusion and/or by stipulating a number of modes and/or by changing a critical angle in a fiber-optic cable.

Thus, the optical condition is directly adjusted, in particular, via an optical material characteristic (refraction, light absorption and/or light diffusion) of the passive attenuator.

A further advantage is that not only can the light intensity be attenuated, but that only specific light wavelengths or frequencies can also be transmitted. Thus, as well as a functional test, other light transmission tests can also be performed.

"Refractive index" means an optical material characteristic for changing the wavelength and the phase velocity of the light. The light is refracted and reflected due to the different optical densities at the boundary between two media.

"Light absorption" describes the discharge of light energy into matter due to physical interactions.

"Light diffusion" occurs, in particular, when light impinges on small particles, macromolecules in solution and/or suspension, and is scattered in different directions as a result. This causes an attenuation between the incoming and the outgoing light.

The optical conditions can also be adjusted by stipulating a number of modes.

"Modes" means the different paths, which the light photons can follow along the fibers. The number of modes is limited, in particular, by the core diameter of the optical fiber. Multimode fibers can support a large number of modes, so that multiple light waves are simultaneously transferred through multimode fibers. In contrast, in monomode fibers with small core diameters, only one mode can propagate, whose intensity in a radial direction has approximately a normal distribution. For this reason, monomode fibers are better suited for signal transmission over long distances.

Since each mode takes a light path of a different length, the number of modes directly affects the signal transmission.

Thus, a specific attenuation can be set by stipulating the number of modes occurring. For example, a shorter section of a multimode fiber can be used in the mockup to simulate the signal attenuation of a wound monomode fiber.

Thus, the attenuation to be obtained can be stipulated via the number of modes in an entire fiber-optic cable in the mockup, wherein the stipulation, in particular, is made via the selection of the core diameter of the optical fiber.

The attenuation to be obtained can also be realized, however, by a high number of modes in a short section of the optical fiber of the mockup.

The optical conditions can be adjusted by means of the passive attenuator by changing a critical angle in a fiber-optic cable.

"Critical angle" means, in particular, the angle of the total reflection at the boundary between two media.

The so-called bend loss of glass fiber cables can be used for signal attenuation. With the appropriate bending, the angle falls short of the critical angle for the total reflection, whereby a proportion of the light energy is radiated out of the core of the optical fiber into the jacket. This results in a reduction of the light intensity.

It is particularly advantageous that the fiber-optic cable must only be subjected to a bend with a radius of a few centimeters and its composition does not have to be changed. In particular, changing the critical angle by bending to attenuate the signal can be specifically utilized with multimode fibers.

In another embodiment, the passive attenuator features a material or materials, which have a refractive index and/or absorb light and/or disperse light, and/or the passive attenuator is an optical filter, in particular, a gray scale.

One or more materials, in particular, bring about the changes in the light properties described above and the passive attenuator is directly adjusted by adding one or more materials with reference to their optical properties.

For example, by doping with boron or fluorine, a lower refractive index can be applied in the mockup, in one section or over the entire fiber-optic cable.

Likewise, the optical characteristics of the passive attenuator can be adjusted by adding light-absorbing materials, such as dyes or organic materials, which, for example, absorb infrared light.

To increase the light diffusion, suspended particles such as quartz sand and/or macromolecular materials such as colloids, can be added.

"Optical filters" means filters, which select and/or attenuate the incident radiation in accordance with certain criteria, for example, in accordance with the wavelength, the polarization or the direction of arrival. The optical filters can be, for example, color filters such as red filters, UV filters and/or a gray scale.

A "gray scale", in particular, serves to adjust the beam intensity.

Hence, both individual characteristics of the incoming light can specifically be filtered, as well as the overall intensity of the light.

In a further embodiment, the mockup has an active attenuator with an optical receiver, in particular, a photodiode, an electronic circuit and an optical transmitter, in particular, a laser diode, wherein the optical receiver, the optical transmitter and the electronic cables are arranged so that a coupled optical signal is measured at the optical entrance and an optical signal to be transmitted is determined by the electronic circuit, based on the measured optical signal, wherein the optical signal to be transmitted is transmitted by the optical transmitter.

An "optical receiver", in particular, converts light into electrical current. This takes place, for example, using a photodiode.

An "optical transmitter", in particular, converts an electronic signal into light. This takes place, for example, using a laser diode.

An "electronic circuit" processes a signal measured at the optical entrance and, based on the signal, determines an optical signal to be transmitted by the optical transmitter.

A particular advantage of this embodiment is that the optical signal emitted can be adjusted directly in order to simulate the optical condition of a wound optical fiber at the optical exit by means of the mockup.

The active attenuator can also be adjusted via the electronic circuit optical fiber reels of varying lengths with different optical characteristics. It is particularly advantageous that the attenuated signal is specifically modified electronically or using a programmable logic controller.

A further advantage here is that the optical transmission path is realized electronically. As a result, further potential optical loss does not occur in the optical transmission, whereby the susceptibility to error is reduced in the functional test.

Multiple passive and/or active attenuators can be utilized in combination.

In another embodiment, the mockup is connected to a connecting fiber-optic cable or to multiple connecting fiber-optic cables.

A "connecting fiber-optic cable", in particular, is a fiber-optic cable, which, in particular, is connected optically and/or mechanically to the entrance and/or the exit of the mockup.

In particular, the connecting fiber-optic cable can be connected to the entrance and/or the exit of the mockup via a plug-in connection.

Consequently, the light at the optical entrance can be conducted directly into the mockup via a connecting fiber-optic cable and discharged again at the optical exit via a connecting fiber-optic cable.

A further result is that, as a result, there is a direct connection of the mockup with a sinker and/or a launching mechanism and/or an underwater vessel, whereby data transfer and information exchange are enabled.

In a further aspect of the invention, the object is achieved by a mockup system with a first mockup and a second mockup, wherein the mockups are connected via a fiber-optic cable and one of the mockups or both mockups is/are arranged as a mockup as described previously.

An interconnected system is created by the mockup system between two mockups and a fiber-optic cable, whereby there is a lesser occurrence of malfunctions.

In a further embodiment, the fiber-optic cable between the two mockups features a connecting piece.

This has the advantage that data can be exchanged with the underwater vessel via the mockup in the sinker and the connecting cable and, after the functional test, the connecting cable for recovering the underwater vessel and sinker can be separated at the connecting piece.

In a further aspect of the invention, the object is achieved by an underwater vessel and/or sinker, wherein the underwater vessel and/or the sinker has a mockup as described previously as described previously or multiple mockups as described previously and/or a mockup system as described previously.

"Underwater vessel" includes both manned and unmanned self-powered underwater vessels. Here, for example, this refers to a remotely controlled underwater vessel (ROV, Remotely Operated Vehicle), an autonomous underwater vessel (AUV), an underwater mobile unit and/or a manned underwater vessel such as a submarine.

A "sinker" is connected, in particular, to a transfer and launching mechanism via a launching cable and to the underwater vessel via a connecting cable. A sinker is used to hold the connecting fiber-optic cable at a distance from the underwater vessel on transferring an underwater vessel, in order to avoid damage to the connecting fiber-optic cable due to an impact by the underwater vessel.

Hence, a first mockup can be installed in a sinker and a second mockup in an underwater vessel, so that a functional test and a test run can be performed after transferring an underwater vessel and a sinker.

Likewise, launching an underwater vessel can be simulated and tested.

In a further aspect of the invention, the object is achieved by a transfer mechanism, which has a mockup system as described above or multiple mockup systems as described above and/or an underwater vessel as described above and/or a sinker as described above.

A transfer mechanism is any equipment, with which an underwater vessel can be transferred into the water. Here, in particular, this can refer to a crane with or without a lifting cradle or where the underwater vessel is directly connected to the crane. Other transfer equipment can be a slipway, a lifting/lowering device or other equipment used to transfer an underwater vessel into a body of water.

Thus, an underwater vessel can be transferred into the water by means of the transfer mechanism, the transfer of information between the transfer mechanism and the underwater vessel via the mockups can be tested and the underwater vessel can be launched.

A particular advantage of an integrated transfer mechanism is that the overall data transfer can be accomplished without loss and that fewer malfunctions occur using a consistently linked system.

Another device refers to a vessel, which has a transfer mechanism as described above. The vessel can be a land-based vessel, such as a truck or a rail vehicle. In particular, the vessel is a ship, on which the transfer system is installed.

The vessel can also be another underwater vessel, in particular, a manned underwater vessel.

In a further aspect of the invention, the object is achieved by a training method with a mockup as described above, wherein the mockup is installed in an underwater vessel and/or in a sinker.

The particular advantage of this training method is that mockups are utilized instead of wound optical fiber reels in order to train the operating personnel in the transfer and to perform one or more functional tests of the data transfer between the transfer system and the underwater vessel.

In another form of the training method, the underwater vessel and/or the sinker is transferred into a body of water, wherein, in particular, the underwater vessel and/or the sinker is recovered again after use.

By transferring the mockup into the water with the underwater vessel and/or sinker, deploying them there and then recovering them, the mockup can be used again.

The mockup can also subsequently be exchanged for a wound fiber-optic cable or for a mockup with other attenuation characteristics.

In another form of the training method, a spool with a wound fiber-optic cable is removed from an underwater vessel and/or a sinker beforehand.

This is in accordance with the purpose of the invention, that a wound fiber-optic cable is not used for training in transferring an underwater vessel and/or a sinker and is lost as a result, but is exchanged for a mockup.

BRIEF DESCRIPTIONS OF THE DRAWINGS

Figure 2:
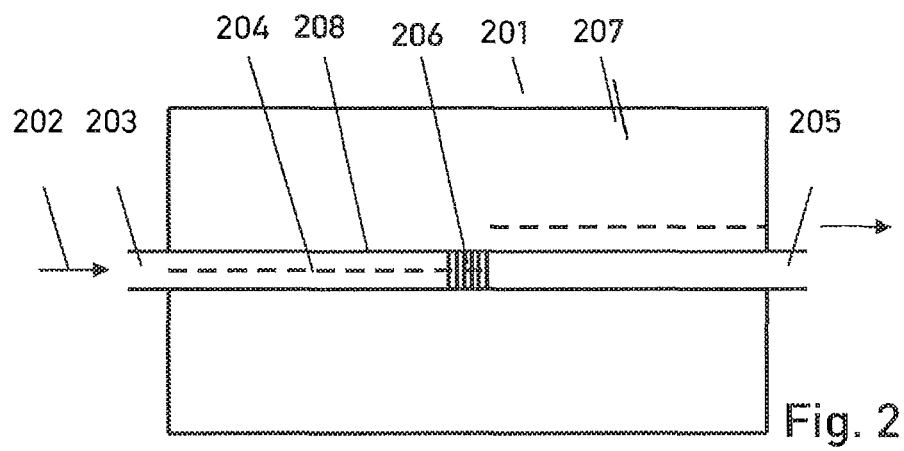
Figure 3:
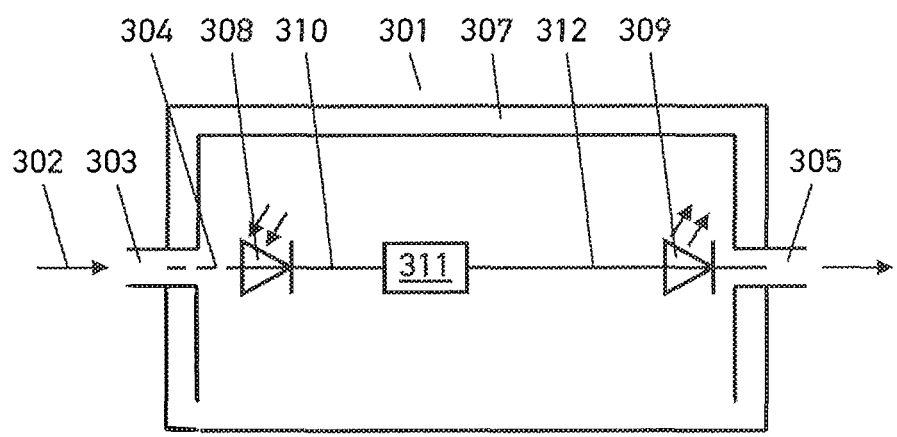
Figure 4:
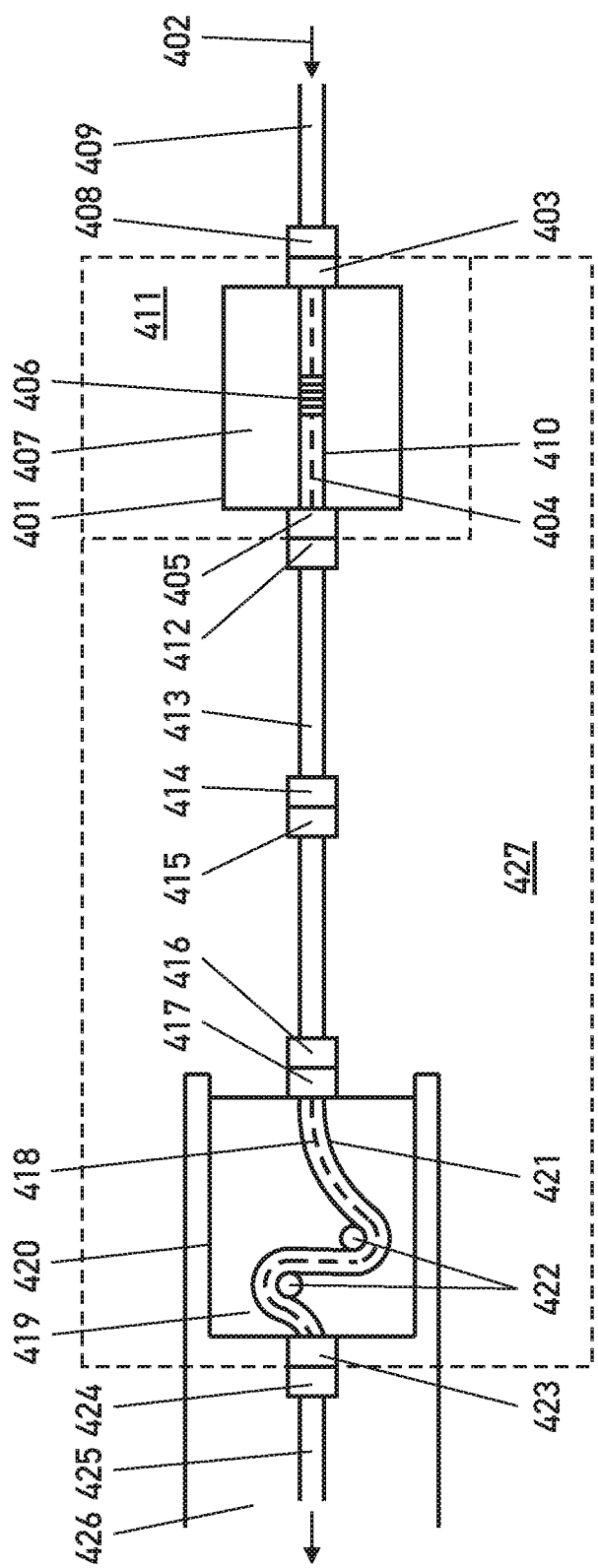
Figure 5:
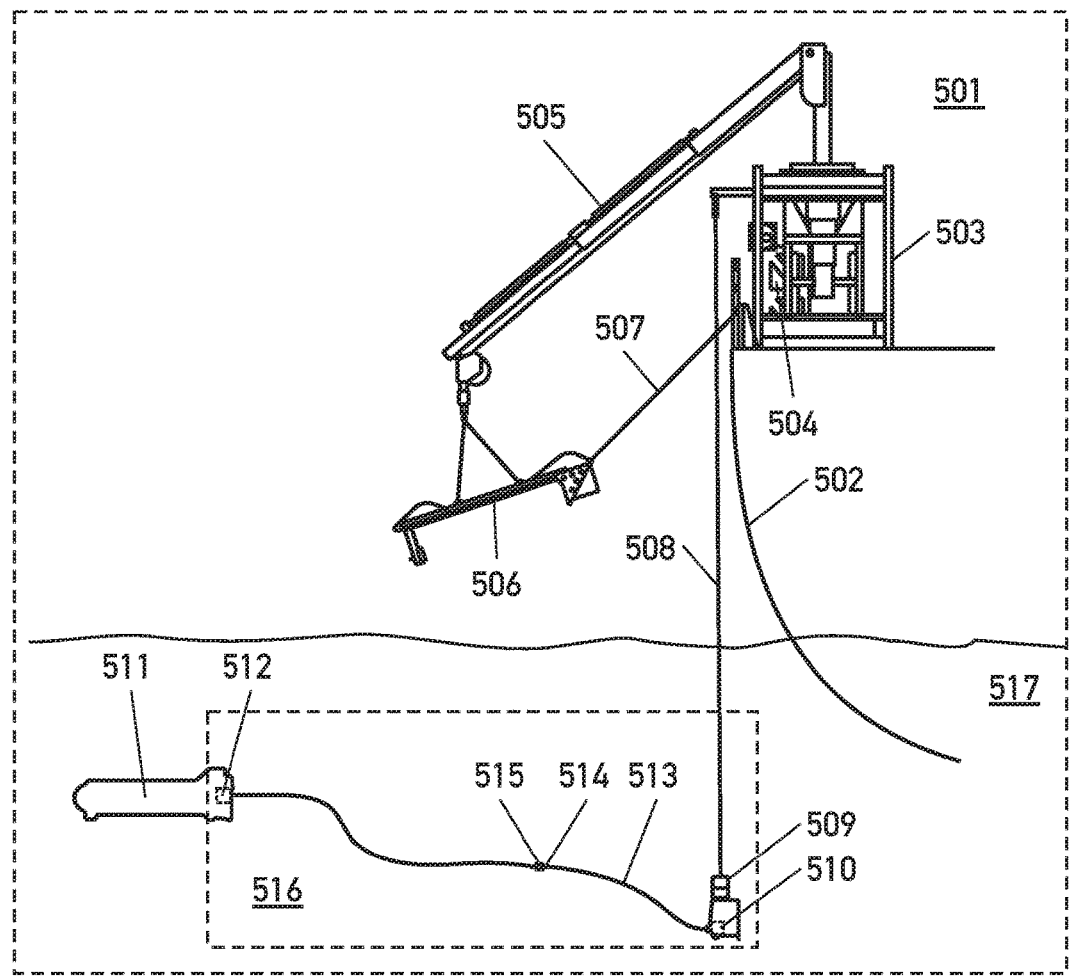

The invention is outlined in more detail in the following by reference to exemplary embodiments. It shows FIG. 1 a schematic representation of a wound optical fiber reel in a cartridge according to the prior art, FIG. 2 a schematic representation of a first mockup of the cartridge with a gray scale introduced into an optical transmission path, FIG. 3 a schematic representation of a second mockup of the cartridge with an electronic circuit, FIG. 4 a schematic representation of a mockup system with two mockups and a connecting cable and FIG. 5 a schematic representation of a transfer system on board a ship with a sinker, an underwater vessel and a mockup system.

DETAILED DESCRIPTION

In FIG. 1, a cartridge 101 according to the prior art has a spool with the cross-wound glass fiber cable 106 with an optical entrance connector 103 and an optical exit connector 105. The wound glass fiber cable 106, which forms the optical transmission path 104 over its length, is arranged between the optical entrance connector 103 and the optical exit connector 105.

FIGS. 2-5, as further discussed below, illustrate aspects of the present inventions.

In use, a light signal 102 with a data stream enters the glass fiber cable 106 via the optical entrance connector 103, is attenuated on transmission through the glass fiber cable 106 and exits again at the optical exit connector 105.

A mockup 207 has a cartridge 201, which is structurally identical to the cartridge 101 of the wound glass fiber cable 106. The light (signal) 202 with a data stream enters a synthetic fiber cable 208 via the optical entrance connector 203. The synthetic fiber cable 208 forms the entire optical transmission path 204 between the optical entrance connector 203 and the optical exit connector 205, which are both structurally identical to the optical entrance connector 103 and optical exit connector 105. A gray scale 206 is arranged in the center of the synthetic fiber cable 208, which attenuates the light intensity. The attenuated light exits at the optical exit connector 205.

The cartridge 201 is deployed in an unmanned underwater vessel. A light signal 202 is injected for a functional test. The gray scale 206 in the synthetic fiber cable 208 is inserted so that the intensity of the attenuated light exiting at the optical exit connector 205 is consistent with the intensity of the light, which exits at the optical exit connector 105 of the wound glass fiber cable 106. Hence, the mockup 207 simulates the wound glass fiber cable 106.

Another mockup 307 has a cartridge 301. The light 302 entering via the optical entrance connector 303 strikes a photodiode 308. From this, an electronic cable 310 leads to an electronic circuit 311, which is connected to another electronic cable 312 with a light-emitting diode 309. The light-emitting diode 309 emits light to the optical exit connector 305.

After the optical entrance connector 303, the irradiation intensity of the light entering 302 is measured. As an optical receiver, the photodiode 308 converts the light into an electronic (measuring) signal, which is conveyed to the electronic circuit 311 via the electronic cable 310. Based on the measured irradiation intensity of the optical signal, the electronic circuit 311 determines an electronic signal to be emitted, which is conducted via the electronic cable 312 to the light-emitting diode 309 as an optical transmitter. The light-emitting diode 309 converts the electronic signal into an optical signal, which is emitted as light, via the optical exit connector 305.

In one application, a cartridge 101 has been removed from the stern of a remotely controlled underwater vessel and, in place of this, the cartridge 301 with the mockup 307 is inserted. A light signal 302 is coupled in between a surface vessel and the remotely controlled underwater vessel, to test the data cable. In actual operation (with the cartridge 101), the intensity of the light between the optical entrance connector 103 and the optical exit connector 105 is decreased by 20% by the wound glass fiber cable 106. For this reason, the electronic circuit 311 in the mockup 307 adjusts the light intensity so that the intensity of the light emitted by the light-emitting diode 309 at the optical exit connector 305 is also reduced by 20%.

Following this functional test, a data signal from a programmable logic controller is injected via the mockup 307, which starts up the drive of the remotely controlled underwater vessel for test operation.

A mockup system 427 has a first mockup 407 in a sinker 411, a connecting glass fiber cable 413 and a second mockup 419 in an underwater vessel 426.

By means of a launching cable 409, the light signal 402 enters the mockup 407 of the sinker 411 through a cable connector 408 and an optical entrance connector 403. The light is conducted by the glass fiber cable 410, which forms the overall optical transmission path 404 of the mockup 407. An infrared filter 406 is located in the center of the glass fiber cable. The filtered light leaves the mockup 407 via the optical exit connector 405 and enters the connecting glass fiber cable 413 via a cable connector 412. Two connection plugs 414 and 415 are located in the center of the connecting glass fiber cable 413. The light enters the optical entrance connector 417 in the mockup 419 via the cable connector 416 of the connecting glass fiber cable 413. The mockup 419 has a cartridge 420, located in the stern of an underwater vessel 426. A glass fiber cable 421 is installed between the optical entrance connector 417 and the optical exit connector 423, which forms the optical transmission path 418 and is longer than the direct, shortest route between the optical entrance connector 417 and the optical exit connector 423.

The attenuation takes place by the fluorine-doped glass fiber cable 421 in the mockup 419. The glass fiber cable 421 is equipped with strain relief elements 422. The attenuated light then leaves the mockup 419 via the optical exit connector 423 and enters the glass fiber cable 425 of the underwater vessel 426 via the cable connector 424.

In a training session, the light from the launching cable 402 is initially attenuated in the mockup 407 after the transfer for the functional test and is then transmitted into the mockup 419 of the underwater vessel 426 via the connecting glass fiber cable 413, by which the light is again attenuated.

Following the functional test, a launch signal 402 is conveyed to the underwater vessel 426 via the mockup system 427. Due to the strain relief elements 422, the glass fiber cable 421 in the mockup 419 is designed in a high-tensile manner. If the tension due to the drive of the underwater vessel 426 is too great in the test operation, the connection plugs 414 and 415 of the connecting glass fiber cable disengage. As a result, the two mockups 407 and 419 are not damaged and can be used again after the underwater vessel and the sinker have been recovered. In an alternative, the connection plugs 414 and 415 disengage under intense force, without triggering the launch of the underwater vessel 426.

A transfer mechanism 501 has a transport and launching mechanism 503 on a ship 502, a mockup system 516, a sinker 509 and an underwater mobile unit 511.

The transfer mechanism 501 is equipped with a crane 505, which has a lifting cradle 506. An underwater mobile unit 511 is transferred into a body of water 517 using this. At the same time, the lifting cradle 506 is kept at a distance by the control line 507 in order to prevent it from hitting against the ship 502.

The underwater mobile unit 511 is lowered into the water 517, together with the sinker 509. The sinker 509 is connected to the launching cable 508. The sinker incorporates a mockup 510, which is also connected to a second mockup 512 of the underwater mobile unit 511 via the connecting glass fiber cable 513.

Together with the connecting cable 513 and the mockup 512 in the underwater mobile unit 511, the mockup 510 in the sinker 509 constitutes a mockup system 516.

For training in the transfer procedure, the underwater mobile unit 511, together with the sinker 509, is lowered into the water by the crane 505 and the lifting cradle 506. The operating personnel trains in transfers by means of the control device 504. The mockup 510 in the sinker 509 and the mockup 512 in the underwater mobile unit 511 are used for functional tests of the data transfer. After the training, the connecting glass fiber cable 513 is released at the connection plugs 514 and 515. The underwater mobile unit 511 and the sinker 509 are recovered. The mockup 510 and the mockup 512 are removed and are replaced by wound glass fiber cable spools for actual operation.

LIST OF REFERENCE NUMERALS 101, 201, 301 Cartridge
102, 202, 302 Light
103, 203, 303 Optical entrance connector 104, 204, 304 Optical transmission path
105, 205, 305 Optical exit connector
106 Wound glass fiber cable
206 Gray scale
207, 307 Mockup
208 Plastic fiber cable
308 Photodiode
309 Light-emitting diode
310 Electronic cable
311 Electronic circuit
312 Electronic cable
401 Cartridge
402 Light from launching cable
403 Optical entrance connector
404 Optical transmission path
405 Optical exit connector
406 Infrared Filter
407 Mockup
408 Cable connector
409 Starter cable
410 Glass fiber cable
411 Sinker
412 Cable connector
413 Connecting glass fiber cable
414 Connection plug
415 Connection plug
416 Cable connector
417 Optical entrance connector
418 Optical transmission path
419 Mockup
420 Cartridge
421 Glass fiber cable
422 Strain relief elements
423 Optical exit connector
424 Cable connector
425 Glass fiber cable
426 Underwater vessel
427 Mockup system
501 Transfer mechanism
502 Ship
503 Transport and launching mechanism
504 Control device
505 Crane
506 Lifting cradle
507 Control line
508 Launching cable
509 Sinker
510 Mockup
511 Underwater mobile unit
512 Mockup
513 Connecting glass fiber cable
514 Connection plug
515 Connection plug
516 Mockup system
517 Water

The invention claimed is:

1. A mockup for simulating optical transmission behavior of a wound fiber-optic cable comprising an optical entrance, an optical exit and an optical transmission path, which optically connects the optical entrance with the optical exit, an optical attenuator arranged in the optical transmission path, wherein an optical condition of the transmission path is adjusted by means of the optical attenuator so that an optical transmission behavior of a wound fiber-optic cable is simulated.

2. The mockup according to claim 1, wherein the optical transmission path features a partial or complete fiber-optic cable.

3. The mockup according to claim 2, wherein the mockup further comprises strain relief elements for the fiber-optic cable.

4. The mockup according to claim 1, wherein the attenuator comprises an active attenuator, a passive attenuator, or both an active attenuator and a passive attenuator.

5. The mockup according to claim 4, wherein the attenuator comprises a passive attenuator, and the optical condition is adjusted by means of the passive attenuator by:
   (a) changing a refractive index, a light absorption, or a light diffusion, or a combination of any thereof;
   (b) stipulating a number of modes;
   (c) changing a critical angle in a fiber-optic cable; or
   a combination of any thereof.

6. The mockup according to claim 4, wherein the attenuator comprises a passive attenuator having (i), (ii), or a combination of any thereof, wherein
   (i) features a material or multiple materials, which (a) have a refractive index, (b) absorb light, or (c) scatter light, or a combination of any thereof; and
   (ii) is an optical filter, optionally a gray scale optical filter.

7. The mockup according to claim 4, wherein the attenuator comprises an active attenuator having an optical receiver, an electronic circuit and an optical transmitter, wherein the optical receiver, the optical transmitter and the electronic cables are arranged so that a coupled optical signal is measured at the optical entrance and an optical signal to be transmitted is determined by the electronic circuit, based on the measured optical signal, wherein the optical signal to be transmitted is transmitted by the optical transmitter.

8. The mockup according to claim 1, wherein the mockup is connected to a connecting fiber-optic cable or to multiple connecting fiber-optic cables.

9. A mockup system comprising a first mockup and a second mockup, wherein the mockups are connected via a fiber-optic cable and at least one of the mockups or both the first and the second mockups is a mockup according to claim 1.

10. A mockup system according to claim 9, wherein the fiber-optic cable has a connection plug.

11. An underwater vessel and/or sinker, wherein the underwater vessel has one mockup according to claim 1, or the sinker has one mockup according to claim 1, or the underwater vessel has one mockup according to claim 1 and the sinker has one mockup according to claim 1.

12. A transfer mechanism having a mockup system or multiple mockup systems according to claim 9.

13. A vessel having a transfer mechanism according to claim 12.

14. A training method with a mockup according to claim 1, wherein said training method the mockup is utilized in an underwater vessel, a sinker, or in both an underwater vessel and a sinker.

15. The training method according to claim 14, wherein the training method includes the steps of transferring the underwater vessel, the sinker, or both the underwater vessel and the sinker into a body of water; and optionally thereafter recovering the underwater vessel, the sinker or both the underwater vessel and the sinker.

16. The training method according to claim 14, wherein the training method further comprises removing a spool with a wound fiber-optic cable beforehand from the underwater vessel, the sinker, or from the underwater vessel and from the sinker.

* * * * *